Dec. 7, 1926.　　　　　　　　　　　　　　　　1,609,606
A. E. CLAWSON
THERMOMETER FITTING
Filed August 25, 1925

Inventor
Albert E. Clawson
By
his Attorney

Patented Dec. 7, 1926.

1,609,606

UNITED STATES PATENT OFFICE.

ALBERT E. CLAWSON, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER FITTING.

Application filed August 25, 1925. Serial No. 52,333.

This invention relates to thermometer fittings and more particularly to the variety adapted for use with pipe lines, the chief object of the invention being to provide a simple and practical fitting of this nature, having a sanitary form of construction eliminating all threading and other irregularities from the inner surfaces of the pipe. A further object is to provide such a construction capable of being readily detached into its principal parts for cleaning and replacement. Still a further object is the provision of a device of the above character conveniently adaptable to thermometers and pipes of various sizes by the replacement of a single connecting part. To these and other ends the invention resides in certain improvements and combinations of parts all as will hereinafter be more fully described, the novel features being pointed out in the claims at the end of the specification.

In the drawings.

Similar reference numerals throughout the several views indicate the same parts.

The invention is illustrated in the present instance as embodied in a multiple type fitting of a variaty adapted to occupy the position of an elbow joining two pipes, but it is to be understood that the invention is applicable as well to single type fittings for mounting a single thermometer and to fittings for T and various other pipe connections.

Referring more particularly to the drawings, 5 and 6 represent pipes with the adjacent ends of which are connected, in any suitable manner, the communicating branches 7 and 8 of a pipe section 9 serving as an elbow joining the pipes. The present embodiment being intended primarily for use of a so-called sanitary nature, the joints between pipes 5 and 6 and the branches of the section 9 are preferably, as shown, of such a nature as to afford a smooth interior connection devoid of crevices or irregularities capable of trapping the liquid.

Figure 1:
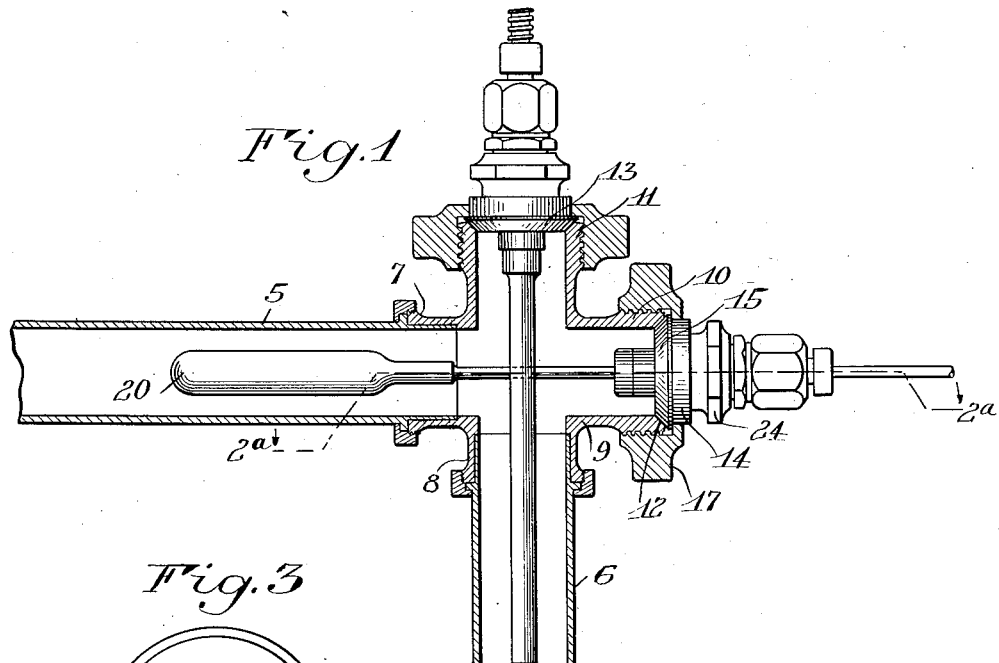
Figure 1 is a sectional view of a fitting embodying the present invention.
Figure 3:
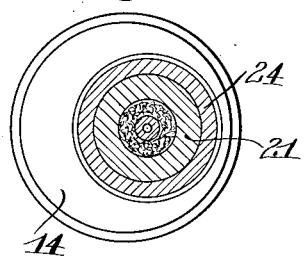
Figure 3 is a sectional view on the line 3ª—3ª in Figure 2.
Figure 2:
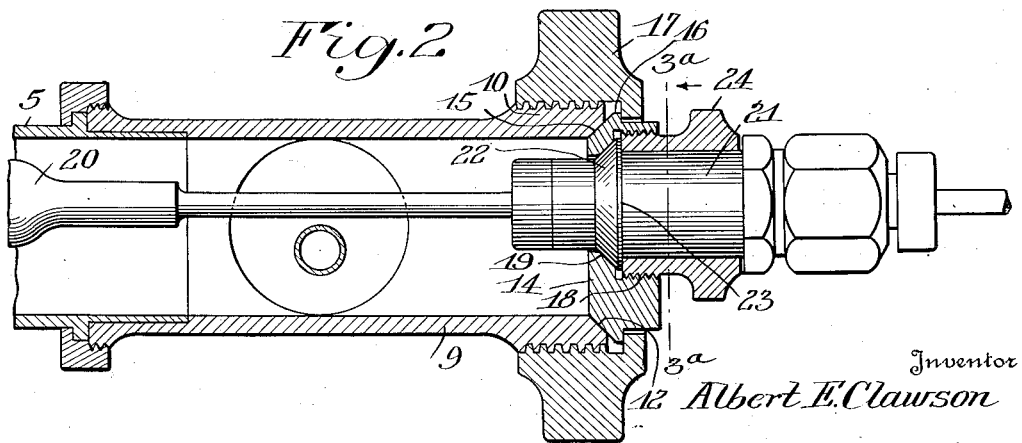
Figure 2 is an enlarged sectional view substantially on the line 2ª—2ª in Figure 1.

Pipe section 9 is formed with a plurality of angularly extending branches 10 and 11 in prolongation of the branches 7 and 8 and pipes 5 and 6, respectively. These branches 10 and 11 have externally threaded open ends formed with seats 12 and 13, and since the fittings for these branches are in the present instance identical, a description of the fitting applied to branch 10 and shown in detail in Figures 2 and 3 will suffice for both.

The fitting comprises, preferably, a closure 14 in the present instance in the nature of a ferrule formed externally with a seat 15 adapted to cooperate with the seat 12 of the section end 10. The ferrule is detachably connected to the corresponding section end by means in the present instance of a union nut 16 engaging with a shoulder 17 on the ferrule and with the threading on the section end, as shown. The ferrule has an internal threaded portion 18 and an inner seat 19, the latter being preferably eccentric relatively to the outer seat 15. The latter portions of the ferrule are for the detachable mounting therein of the thermometer, as will now be described.

The thermometer bulb is shown at 20 as inserted into the pipe through the closure or ferrule 14 and thus positioned directly in the liquid passing through the pipe for accurately taking the temperature of the same. The thermometer may be of the well-known glass tube type or of the capillary tube variety, being in either case preferably provided with a casing, indicated generally at 21 as formed with a seat 22 cooperating with the inner seat 19 of the ferrule. The casing has also a shoulder portion 23 with which cooperates the end of a union nut 24 swiveled on the casing and having an externally threaded end engaging the threaded portion 18 of the ferrule for forcing the thermometer seat into intimate contact with the seat of the ferrule.

One, or preferably both of the ferrules in a double pipe fitting such as shown, have the inner seat of the ferrule eccentric as described and the ferrules are so positioned in the fittings that the thermometer bulbs or tubes are disposed toward opposite sides of the fitting so that they pass each other without contact and in such a relation that either may be separately withdrawn without interference by the other.

The invention thus provides, in a simple and practical construction, a form of fitting in which the thermometer is readily detachable from the fitting and the fitting as well from the pipe, the joints between all of the parts being fluid tight and of such a character as to eliminate threading and similar irregularities from the interior of the pipe to thus avoid the unsanitary trapping or retention of the liquid. It is to be noted that any size thermometer may be adapted to any size of pipe merely by the substitution of a ferrule of corresponding dimensions and the above and other advantages, which will be obvious to those skilled in the art, afford a fitting of a convenient, efficient and highly sanitary character.

I claim as my invention:

1. In a sanitary fitting, the combination of a pipe section having an end provided with a seat, a closure for said section, having a seat co-operating with the seat of the latter and means for holding the closure in sealing position upon the pipe section, a thermometer extending through the closure and a sanitary connection including a seat on the closure and the thermometer respectively for co-operation to provide a liquid-tight seal and means for holding the thermometer in sealing position upon the closure.

2. In a sanitary fitting the combination with a pipe section having an end provided with a seat, of a ferrule having an outer seat cooperating with said section seat and having also an inner seat, a union nut securing said section and ferrule together, a thermometer inserted through said ferrule having a seat cooperating with said inner ferrule seat, and a union nut securing said thermometer and ferrule together.

3. In a sanitary fitting, the combination with a pipe section having an end provided with a seat, of a ferrule having relatively eccentric inner and outer seats, the outer of said seats cooperating with said section seat, a union nut securing said section and ferrule together, a thermometer inserted through said ferrule having a seat cooperating with said inner ferrule seat and a union nut securing said thermometer and ferrule together.

4. In a sanitary fitting, the combination with a pipe section having an externally threaded open end provided with a seat, of a ferrule having an internally threaded portion and inner and outer seats, the outer of said seats cooperating with said section seat, a thermometer inserted through said ferrule having a casing provided with a seat cooperating with said inner ferrule seat, and union nuts cooperating with said threaded portions of section and ferrule for securing the latter to said section and thermometer.

5. A sanitary thermometer fitting for a pipe end seat comprising a ferrule having inner and outer seats, the outer of said seats being adapted to cooperate with said pipe seat, a thermometer inserted through said ferrule having a seat cooperating with said inner ferrule seat, and union nuts for securing said ferrule to said pipe and thermometer.

6. In a sanitary fitting, the combination with a pipe section having a plurality of angularly extending ends each provided with a seat, of a closure for each of said section ends provided with a seat cooperating with said corresponding end seat, means detachably securing each closure to its section end, and a thermometer inserted eccentrically through each closure and having a detachable, sanitary connection with the same.

7. In a sanitary fitting, the combination with a pipe section having a plurality of angularly extending ends each provided with a seat, of a ferrule for each of said ends provided with inner and outer relatively eccentric seats, the outer of said seats cooperating with said seat of the corresponding section end, means detachably securing each ferrule to its section end, a thermometer inserted through each ferrule having a seat cooperating with said inner ferrule seat, said thermometers being disposed to pass one another by the eccentricity of said ferrule seats, and means detachably securing each thermometer to its ferrule.

8. In a sanitary fitting, the combination with a pipe section having a plurality of angularly extending ends each provided with a threaded portion and a seat, of a ferrule for each of said ends provided with a threaded portion and with relatively eccentric inner and outer seats, the outer of said seats cooperating with said seat of the corresponding section end, a thermometer inserted through each of said ferrules having a casing provided with a seat cooperating with the inner seat of its ferrule, said thermometers being disposed to pass one another by the eccentricity of said seats, and union nuts securing each ferrule to its section end and thermometer.

ALBERT E. CLAWSON.